United States Patent [15] 3,697,630
Yoshino [45] Oct. 10, 1972

[54] BONDING OR REPAIRING PROCESS

[72] Inventor: Stanley Y. Yoshino, Monterey Park, Calif.

[73] Assignee: Granted to National Aeronautics & Space Administration under the provisions of 42 U.S.C. 2457(d)

[22] Filed: Aug. 23, 1967

[21] Appl. No.: 662,763

[52] U.S. Cl. ..................264/28, 264/36, 264/40, 264/102
[51] Int. Cl. ...............................................B05b 3/00
[58] Field of Search...............264/36, 40, 28, 30, 102

[56] References Cited

UNITED STATES PATENTS

| | | | |
|---|---|---|---|
| 1,883,196 | 10/1932 | Wertz | 264/36 |
| 2,428,977 | 10/1947 | Mares | 264/28 |
| 2,706,311 | 4/1955 | Durst | 264/28 |
| 2,911,678 | 11/1959 | Brunfeldt | 264/102 |
| 3,200,180 | 8/1965 | Russ | 264/102 |
| 3,229,445 | 1/1966 | Kraft | 264/40 X |

Primary Examiner—Robert F. White
Assistant Examiner—Allen M. Sokalas
Attorney—Russell Schlorff, Marvin F. Matthews, Alvin S. Bass, Leonard Rawicz and John B. Farmakides

[57] ABSTRACT

A process for bonding a resinous body in a cavity is described including the steps of outgassing and freezing a body of normally liquid, uncured resinous material to form a void free body and fitting the frozen body into a cavity. Thereafter the frozen resinous material is thawed and the liquid conforms to the shape of the cavity. The resinous material is then cured in the cavity to provide a good bond to the walls thereof.

7 Claims, 6 Drawing Figures 3,697,630

BONDING OR REPAIRING PROCESS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435, 42 U.S.C. 2457).

BACKGROUND

One of the most dangerous aspects of a space mission is the re-entry phase into the earth's atmosphere. Much depends on the ability of the heat shield to ablate and dissipate the extreme heat created by the friction of the earth's atmosphere on the high velocity vehicle. Current practice is to equip each space vehicle with a new heat shield which greatly affects the mission cost. It is highly desirable to repair or refurbish heat shields on space vehicles so that they can be reused.

In the handling of an ablative material damage may inadvertently be done to the surface thereof or a defect may be located in the originally made part. If this should occur it is desirable to have a repair technique which is simple enough to be used either in production facilities or at a launch site, for example. The repair procedure should not involve complex or costly equipment and should provide a highly reliable product after repair.

Two techniques have been employed in the past for repair of heat shields. These both involve removal of damaged areas and bonding of a plug into the resultant cavity. In one of the techniques a precured plug is adhesively bonded into the cavity and in the other, uncured liquid ablator is poured into the cavity and cured in place.

Precured plugs adhesively bonded in place have the disadvantage that the bond between the plug and the original heat shield may not be continuous and or the bond may be relatively weak. Conventional inspection procedures do not give an indication of the strength of the bonds obtained. Shallow, precured plugs adhesively bonded in place may be pulled out of the heat shield surface under the extreme aerodynamic shear conditions of re-entry.

Plugs made by casting an uncured resin in a cavity and curing in place suffer from the extreme disadvantage that voids may be present in the plug and inspection techniques for detecting and locating such voids are not readily available. The reliability of such cast plugs is therefore always in doubt.

BRIEF SUMMARY OF THE INVENTION

Thus, in the practice of this invention, according to a preferred embodiment, there is provided a process for affixing a resinous body in a cavity comprising freezing of a normally liquid, uncured resin into a solid body closely fitable within the cavity. The frozen uncured resin is then thawed in the cavity and cured to provide a bond to the walls of the cavity.

Objects and many of the attendant advantages of this invention will be readily appreciated as the same becomes better understood by reference to the following detailed description when considered in connection with the accompanying drawings wherein.

Throughout the drawings, like reference numerals refer to like parts.

Figure 1:
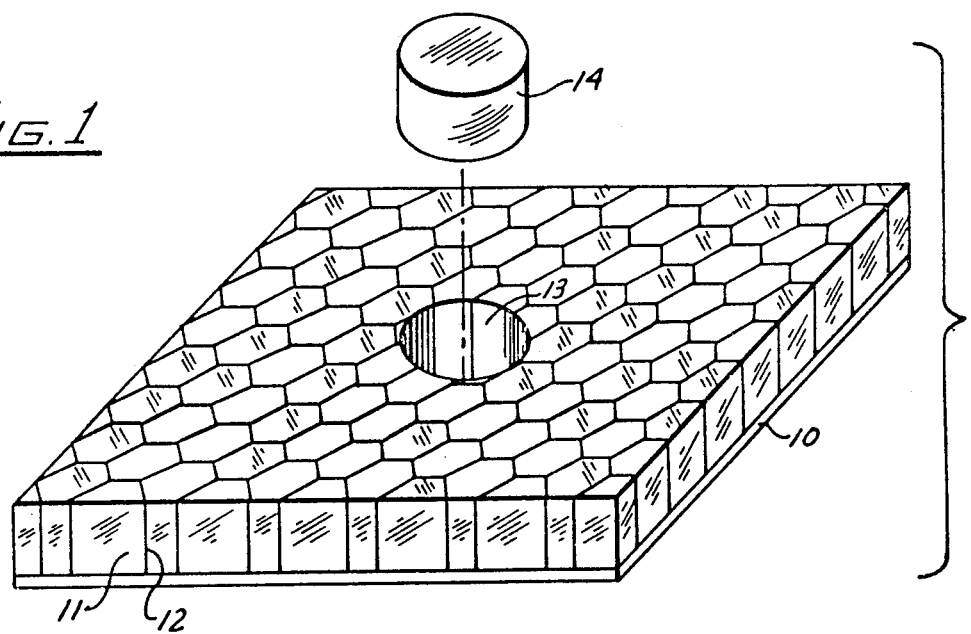
FIG. 1 illustrates in perspective a typical section of heat shield material with a repair plug.

In the practice of this invention according to a preferred embodiment there may be provided an ablative material for affording heat protection in environments involving extreme heating rates and high aerodynamic shear. Such ablative materials are useful on space vehicles re-entering the earth's atmosphere for affording thermal protection for the primary structure of the vehicle. A portion of a typical ablative structure is illustrated in FIG. 1. The ablative material is preferably bonded to a metal substrate 10 which might, for example, form the skin of a space vehicle. In a typical embodiment the ablative material may comprise a silicone resin 11 on the metal substrate 10 and within the cells of a honeycomb 12. A typical honey-comb material useful in practice of this invention comprises a glass fabric impregnated and bonded with a cured, nylon modified phenolic resin in a honeycomb pattern having cells about three-eighths inch across the flats of the hexagonal cells. The thickness of the honeycomb structure normal to the skin 10 is usually the full thickness of the ablative material and may run from less than an inch to several inches in thickness depending on the total heat flux which must be tolerated. The glass fabric honeycomb structure provides strength for the silicone ablative under the strong aerodynamic shear environment often encountered by ablative materials.

The ablative material may comprise any of a number of silicone resins' such as are cured from methyl-phenyl-siloxane or diphenyl-siloxane. These materials can be cured at room temperature or moderately elevated temperatures by tin octoate or the like to produce a rubbery material known as silicone rubber. A typical ablative silicone rubber base material also includes a small amount of titanium dioxide for enhancing heat resistance and about five percent by weight of small hollow glass spheres known to those skilled in the art as microballoons. The glass microballoons serve to enhance heat resistance and also reduce the density of the ablative material and decrease the thermal conductivity thereof, all of which are significant for use of an ablative material in a space vehicle. A suitable ablative silicone material of this type is commercially available from Dow-Corning Company under the trade designation, DC—325.

Figure 4:
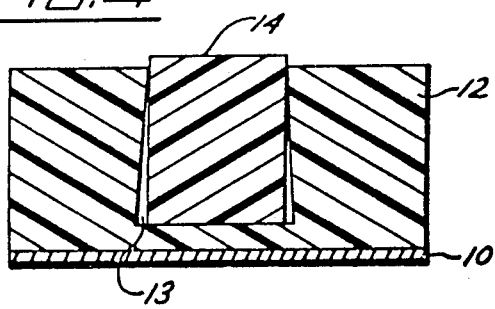
FIG. 4 illustrates the frozen plug of FIG. 3 in a cavity in a heat shield.

A repair procedure for heat shields is provided in the practice of this invention including the step of cutting out the damaged area to provide a cavity in the heat shield. It is preferred to bore or drill the damaged area so that clean walls are provided on the cavity and chips or other possible contaminants can be readily removed. Thus, as illustrated in FIG. 1 a cylindrical cavity 13 is bored in the ablative heat shield to any desired depth so that a repair plug 14 can be formed therein. In order to form a reliable repair it is significant that the plug be firmly bonded to the walls of the cavity and be substantially free of voids. Thus, in order to provide a mechanical joint, in addition to adhesion between the plug material and the original heat shield material, it may be desirable to slightly undercut the cavity 13 as illustrated in FIG. 4 so that the plug is slightly larger at its inner end than at its outer end. It is found that a reverse draft of about 2° is sufficient to provide good mechanical locking between the plug and the original heat shield.

Figure 2:
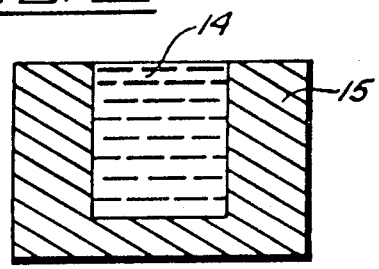
FIG. 2 illustrates a liquid repair plug cast in a mold.

In order to assure that the repair is free of voids it is desirable to form the plug prior to insertion in the cavity in the ablative material. Thus, as illustrated in FIG. 2, a plug 14 is cast in a metal mold 15. In casting a cylindrical plug a conventional split metal mold may be employed and if desired, a thin release layer of polytetrafluoroethylene (Teflon) or the like may be provided on the surfaces of the mold to prevent sticking of the silicone material thereto. It is preferred in forming a plug for an ablative material to employ substantially the same resin system as employed in the original ablative for maximum compatibility therebetween. Thus, for example, DC—325 silicone base ablative material is employed as a plug in a heat shield made of similar material.

In order to cast a plug as illustrated in FIG. 2, the silicone material is mixed with its appropriate catalyst such as tin octoate and placed in a vacuum chamber (not shown) which is evacuated for removing any entrapped gas from the resin. Since the uncured resin is a relatively viscous, cohesive material it is preferred to observe the evacuation of the uncured resin and slowly pump the chamber down with stops as necessary to permit bubbles to rise to the surface and break. Otherwise, the resin rises like bread dough and may bubble over the top of the container in which it is mixed and evacuated. A technique involving repeated evacuation and rapid breaking of vacuum gives high quality, void free plugs. Normally, a vacuum of 26 to 28 inches of mercury is sufficient to adequately outgas the material and reasonable size quantities, such as a gallon, are sufficiently outgassed in from 30 minutes to an hour.

The outgassed resin is then poured into the mold 15 to the desired depth and the filled mold is again placed in a vacuum chamber for further evacuation and outgassing. It is found that, in the absence of the second evacuation step after casting into the mold, voids may be present in the cast plug and will remain in the finished product.

Figure 3:
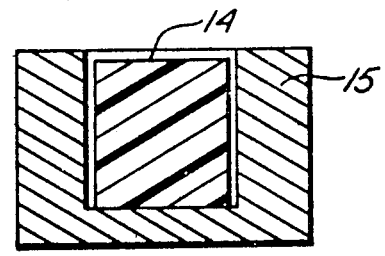
FIG. 3 illustrates the plug of FIG. 2 frozen in the mold.

After the uncured resin in the mold is outgassed, the mold and the uncured resin therein are immersed in a cryogenic fluid in order to lower the temperature to a point where the liquid resin is completely frozen or solidified. It has been found with plugs as much as 2 inches in diameter that immersion in liquid nitrogen for a period of approximately 2 minutes is sufficient for solidifying a silicone resin. Due to the extreme cold of the liquid nitrogen (about −346° F) the resinous plug, upon solidification, shrinks noticeably and draws away from the sides of the mold as illustrated in FIG. 3. It is estimated that at these temperatures shrinkage of about 2 percent occurs. If desired, a mixture of alcohol and dry ice at about −70° E is sufficient for solidification of many resinous materials, however, terminal contraction is less.

Because of the shrinkage that occurs on freezing of the liquid uncured resin, the cavity in the article to be repaired can be smaller than the diameter of the casting mold. Thus, for example, mold diameters of 0.625, 1.500 and 2.000 inch were employed and the corresponding cavity diameters were at least 0.621, 1.492 and 1.988 inch respectively, each with a tolerance of +0.008 inch, −0.000 inch. Thus, even at the maximum tolerance the nominal two inch diameter cavity was smaller than the mold diameter.

After casting and freezing the uncured plug the mold 15 can be stripped away and the frozen plug can be used immediately or stored at low temperature until required. (It is known that silicone resin can be stored as long as 4 weeks at 0° F after catalyzing.) It is preferred to immerse the frozen plug in liquid nitrogen for an additional 30 to 120 seconds in order to assure that the plug is frozen to the center.

It is also preferred to non-destructively test the frozen plug for the presence of voids so that the reliability and integrity of the resultant repaired heat shield can be confirmed. Testing can be by X-ray examination of the frozen plug or ultrasonic measurements can be made since the frozen material has a fairly low sonic attenuation. Unexpectedly it is found that freezing itself provides a type of "proof" test since frozen plugs that are not adequately outgassed in the mold usually crack upon freezing. Such testing prior to repair cannot be done with plugs cast in place.

Figure 5:
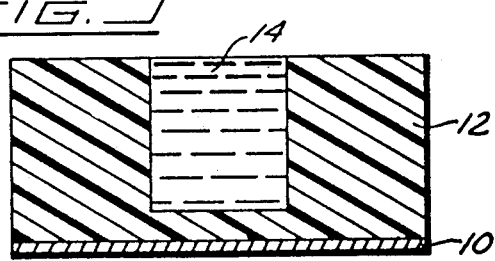
FIG. 5 illustrates the plug of FIG. 4 upon thawing.
Figure 6:
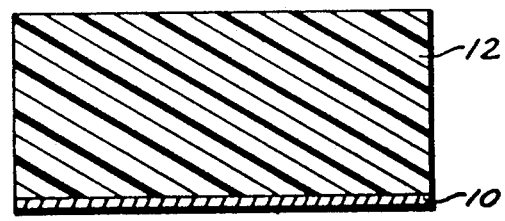
FIG. 6 illustrates a cured heat shield.

If desired the frozen plug 14 is readily sawed or cut to the proper length for use in repairing a heat shield. When a repair is made the frozen plug 14 of uncured resin is inserted in the cavity 13 in the ablative material 11 as illustrated in FIG. 4. The uncured resin is then permitted to thaw and the liquid plug 14 conforms to the walls of the cavity in the ablative material as illustrated in FIG. 5. After complete thawing of the resinous material it is cured and forms a unitary body with the original material as illustrated in FIG. 6. In this manner the advantages of precured and cast-in-place plugs are retained without the disadvantages. The frozen plug is amenable to non-destructive testing before insertion in the cavity like a precured plug and yet conforms and bonds the cavity walls, even if undercut, like a cast plug. A silicone resin such as DC—325 cures completely at room temperature in about 24 hours. If desired the curing time can be reduced to about four hours by heating to 150° F and to about 15 minutes at about 300° F. It is preferred to cure at room temperature since this requires no special equipment and there is no concern about heating the entire mass of resin uniformly.

It is preferred in the practice of this invention to employ a silicone base resinous material for the frozen plug since, in addition to providing good ablation characteristics, the condensed water on the surface of the frozen plug, which will almost invariably occur between cold storage and insertion in the cavity, actually enhances the curing of the silicone resin. The presence of condensed water may be detrimental to other resin systems but is not harmful to many castable condensation resins such as water base neoprene latex resins or epoxy resins and these may also be employed in the practice of this invention. If desired other ablative resin systems can be employed for a plug such as Dow Corning DC98—002 or the repair technique can be applied to other ablative materials such as Avco Avcoat 5026–39 or Emerson-Cuming Thermo-Lag T-500–111. In general, it is preferred that the frozen plug be the same material as the heat shield for maximum compatibility.

It is found that repair plugs without honeycomb reinforcement as much as two inches in diameter can be satisfactorily employed in an ablative heat shield of the same material as the plug. Repair plugs in an ablative material were subjected to re-entry heating conditions wherein the heat flux rose to about 115 BTU/ft$^2$-second at 120 seconds after initiation of heating; dropped off to about 30 BTU/ft$^2$-second at about 280 seconds; rose again to about 50 BTU/ft$^2$-second at 400 seconds; and dropped off to substantially zero at about 700 seconds. An aerodynamic shear in the order of about three pounds per square inch occurred across the surface of the ablative throughout this period. It was found that plugs made according to principles of this invention up to at least 2 inch diameter ablated at substantially the same rate as surrounding honeycomb reinforced ablative material and that no substantial difference in thermal protection of underlying material was encountered.

What is claimed is:

1. A process for affixing a resinous body in a cavity in a solid body comprising:
   at least partly outgassing an uncured liquid resinous material;
   casting the liquid resinous material into a mold;
   evacuating the liquid resinous material in the mold for removing the trapped air therefrom and assuring a void free resinous material;
   freezing and cooling the resinous material prior to complete curing thereof for solidifying and shrinking the cast body of resinous material;
   non-destructively testing the frozen body of resinous material for detection of voids therein;
   fitting at least a portion of said body of dense frozen uncured resinous material into a preformed cavity having substantially the same size and shape as the portion;
   thawing the frozen resinous material whereby the resinous material forms a dense liquid that conforms to the cavity; and
   curing the resinous material to form a substantially void free dense filling in said cavity.

2. A process as defined in claim 1 wherein the resinous material comprises a silicone resin curable in presence of water.

3. A process as defined in claim 2 wherein the cavity is in a cured resinous article so that resinous material in the cavity bonds to the surfaces thereof.

4. A process as defined in claim 2 wherein the cavity is undercut so that resinous material in the cavity is interlocked with the surfaces thereof.

5. A process for repairing a cured resinous article comprising:
   removing material from the article for forming a cavity therein;
   at least partly outgassing an uncured liquid resinous material;
   casting the uncured resinous material into a mold substantially the same size and shape as the cavity;
   outgassing the uncured resinous material in the mold;
   freezing and cooling the resinous material to approximately liquid nitrogen temperatures prior to complete curing thereof for solidifying and shrinking the cast body of resinous material;
   non-destructively testing the frozen body of resinous material for detection of flaws therein;
   inserting the frozen body of resinous material found to be free of flaws in said testing step into the cavity in the article;
   thawing the frozen body of resinous material in the cavity whereby the uncured resinous material conforms to the cavity; and
   curing the resinous material into a void free filling in the cavity whereby the resinous material bonds to the walls of the cavity.

6. A process as defined in claim 5 wherein the cured resinous article comprises an ablative heat shield and the uncured resinous material comprises an ablative silicone base elastomer curable in presence of water.

7. A process as defined in claim 5 wherein the cavity is undercut for providing a mechanical connection as well as a bond.

* * * * *